US008865799B2

(12) United States Patent
Wallen et al.

(10) Patent No.: US 8,865,799 B2
(45) Date of Patent: *Oct. 21, 2014

(54) PROCESSES FOR MAKING SILANE, HYDROPHOBATED SILICA, SILICA MASTERBATCH AND RUBBER PRODUCTS

(71) Applicants: Industrias Negromex, S.A. de C.V., Altamira (MX); Cooper Tire & Rubber Company, Findlay, OH (US)

(72) Inventors: Peter J. Wallen, Findlay, OH (US); Christopher J. Hardiman, Farmington, CT (US); Howard A. Colvin, Wayne, OH (US); Gregory C. Bowman, Findlay, OH (US); Jose Eduardo Rojas Reyna, Ciudad Madero (MX)

(73) Assignees: Industrias Negromex, S.A. de C.V., Altamira (MX); Cooper Tire & Rubber Company, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/747,461

(22) Filed: Jan. 22, 2013

(65) Prior Publication Data

US 2013/0192746 A1   Aug. 1, 2013
US 2014/0083598 A9   Mar. 27, 2014

Related U.S. Application Data

(63) Continuation of application No. 12/460,765, filed on Jul. 23, 2009, now Pat. No. 8,357,733.

(60) Provisional application No. 61/135,882, filed on Jul. 24, 2008.

(51) Int. Cl.
C08K 3/36     (2006.01)
C08J 3/22     (2006.01)
C08J 3/16     (2006.01)
C08J 3/215    (2006.01)
C08K 9/04     (2006.01)
C08K 5/54     (2006.01)

(52) U.S. Cl.
CPC ...  C08J 3/22 (2013.01); C08K 5/54 (2013.01); C08J 3/223 (2013.01); C08J 3/215 (2013.01)
USPC ............................ 523/212; 523/213; 428/405

(58) Field of Classification Search
CPC ....................................................... C08J 3/22
USPC ................... 523/212, 213; 428/405
See application file for complete search history.

(56) References Cited

U.S. PATENT DOCUMENTS

| | | |
|---|---|---|
| 3,686,219 A | 8/1972 | Burke |
| 3,689,451 A | 9/1972 | Burke |
| 3,689,452 A | 9/1972 | Burke |
| 3,694,398 A | 9/1972 | Burke |
| 3,700,690 A | 10/1972 | Burke |
| 3,716,513 A | 2/1973 | Burke |
| 3,768,537 A | 10/1973 | Hess et al. |
| 3,840,382 A | 10/1974 | Burke |
| 3,873,489 A | 3/1975 | Thurn et al. |
| 4,072,701 A | 2/1978 | Pletka et al. |
| 4,076,550 A | 2/1978 | Thurn et al. |
| 4,099,981 A | 7/1978 | Mui et al. |
| 4,482,657 A * | 11/1984 | Fischer et al. ................. 523/334 |
| 4,568,259 A * | 2/1986 | Mattson ......................... 425/40 |
| 4,602,083 A * | 7/1986 | Hung ............................ 528/488 |
| 5,205,972 A | 4/1993 | Kafka |
| 5,440,064 A | 8/1995 | Agostini et al. |
| 5,711,904 A | 1/1998 | Eswaran et al. |
| 5,763,388 A | 6/1998 | Lightsey et al. |
| 5,908,660 A | 6/1999 | Griffith et al. |
| 5,919,298 A | 7/1999 | Griffith et al. |
| 5,985,953 A * | 11/1999 | Lightsey et al. .............. 523/212 |
| 6,013,737 A * | 1/2000 | Takagishi et al. .......... 525/332.7 |
| 6,180,710 B1 | 1/2001 | Hergenrother et al. |
| 6,342,552 B1 | 1/2002 | Hergenrother et al. |
| 6,342,560 B1 | 1/2002 | Okel |
| 6,407,153 B1 | 6/2002 | Von Hellens |

(Continued)

FOREIGN PATENT DOCUMENTS

| | | | |
|---|---|---|---|
| JP | 62240327 A | * | 10/1987 |
| JP | 2005075900 A | | 3/2005 |
| WO | WO 2007040143 A1 | | 4/2007 |

OTHER PUBLICATIONS

CAPlus Abstract of JP 62240327 (Oct. 1987, AN 1988:113976).*

(Continued)

Primary Examiner — Brieann R Fink
(74) Attorney, Agent, or Firm — Stephen S. Hodgson

(57) ABSTRACT

The present invention provides a process for making silica-filled rubber masterbatch using silica hydrophobated with a trimethoxy silane coupling agent that is soluble in an alcohol-water solution containing at least about 70 wt % water. One embodiment uses a mixture of trimethoxy silanes, one or more of which react with rubber to bond the silica to the rubber, and one or more of which do not react with rubber, but do hydrophobate the silica. Hydrophobated silica is mixed with latex polymer and incorporated into rubber during coagulation of the latex, which is preferably coagulated with calcium chloride. The present invention further provides a process for making the trimethoxy silane coupling agents. Preferred trimethoxy silane coupling agents include bis-(3-trimethoxysilylpropyl)-disulfide and bis-(3-trimethoxysilyl-propyl)-tetrasulfide. Rubber products, particularly tires, compounded with the inventive silica masterbatch can be processed for a long time before scorching because the silica masterbatch provides a long scorch time.

19 Claims, No Drawings

(56) References Cited

U.S. PATENT DOCUMENTS

| | | |
|---|---|---|
| 6,465,670 B2 | 10/2002 | Thise et al. |
| 6,521,691 B1 | 2/2003 | Agostini et al. |
| 6,559,329 B2 | 5/2003 | Pohl et al. |
| 6,579,929 B1 | 6/2003 | Cole et al. |
| 6,617,325 B1 | 9/2003 | Lehmann-Lintz et al. |
| 6,646,028 B2 | 11/2003 | Lopez-Serrano Ramos et al. |
| 6,649,684 B1 | 11/2003 | Okel |
| 6,713,534 B2 | 3/2004 | Goerl et al. |
| 6,720,369 B2 | 4/2004 | Goerl et al. |
| 6,736,891 B1 | 5/2004 | Bice et al. |
| 6,740,704 B2 | 5/2004 | Konno et al. |
| 6,822,045 B2 | 11/2004 | Miyatake et al. |
| 7,056,449 B2 | 6/2006 | Hoefler |
| 7,101,922 B2 | 9/2006 | Chen et al. |
| 7,307,121 B2 | 12/2007 | Zhang et al. |
| 7,619,028 B2 | 11/2009 | Watanabe et al. |
| 8,357,733 B2 * | 1/2013 | Wallen et al. ................. 523/213 |
| 2003/0114559 A1 | 6/2003 | Su et al. |
| 2003/0119946 A1 | 6/2003 | Chen et al. |
| 2004/0014869 A1 | 1/2004 | Wong et al. |
| 2005/0009955 A1 | 1/2005 | Cohen |
| 2006/0086450 A1 | 4/2006 | Hogan et al. |
| 2007/0155890 A1 | 7/2007 | Chen et al. |
| 2008/0004375 A1 | 1/2008 | Kondo et al. |
| 2008/0227910 A1 | 9/2008 | Odaka |

OTHER PUBLICATIONS

Machine translated English equivalent of JP 2005-75900, Mar. 2005.
International Preliminary Report on Patentability and Written Opinion issued Feb. 3, 2011, for corresponding International Application No. PCT/US2009/004325 having an International Filing Date of Jul. 23, 2009, 9 pages.

* cited by examiner

US 8,865,799 B2

PROCESSES FOR MAKING SILANE, HYDROPHOBATED SILICA, SILICA MASTERBATCH AND RUBBER PRODUCTS

CROSS REFERENCE TO RELATED APPLICATIONS

This is a continuation of application Ser. No. 12/460,765, filed Jul. 23, 2009, which issued as U.S. Pat. No. 8,357,733 on Jan. 22, 2013, which is incorporated by reference, which claims priority to U.S. Provisional Patent Application Ser. No. 61/135,882 filed by the inventors on Jul. 24, 2008, and which is incorporated by reference.

FIELD OF THE INVENTION

This invention pertains to a process for making methoxy silanes, using the methoxy silanes to hydrophobate silica, using the hydrophobated silica in an emulsion or wet process for making a silica-filled rubber masterbatch, and using the silica masterbatch in rubber formulations, particularly tires.

BACKGROUND OF THE INVENTION

In making tires and other rubber products, it is desirable to mix silica with an elastomer or rubber to improve certain properties of the elastomer. It is well known to incorporate silica into rubber using a dry mixing process, where a material is put on the surface of the silica during the mixing process to allow it to blend into the rubber. When the silica is coated with such an agent, the silica is referred to as hydrophobated and any material used to make hydrophobated silica is a hydrophobating agent. Silane compounds have been developed as hydrophobation agents. Processes for incorporating silica into rubber using the dry mixing process have been effective, but are time-consuming and energy-intensive. In the dry mixing process, rubber, silica, a silane and some of the compounding ingredients are fed into a Banbury rubber mixer, where the silica reacts with the silane to form a reaction mix compound. This pass may take 10 minutes or longer and greatly reduces the efficiency of the mixing operation. The mixing process requires a great deal of time and capital, operating and maintenance expense. Further, ethanol from the silane must be removed in the mixing step or in a downstream processing step. Rubber mixing facilities are not designed to function as chemical plants, and extra equipment must be installed to either isolate or to burn the alcohol so as to meet environmental standards. The reaction mix compound is further mixed in a remill step, where additional ethanol may be removed and additional compound ingredients may be added. This pass, however, is used primarily to improve the dispersion of the silica and reduce the Mooney viscosity of the stock. The remilled stock is combined with curatives in a final mix to produce a rubber compound suitable for use in tire tread stock.

Scorch time is a very important parameter in processing rubber. Scorch time is a reflection of the fully compounded rubber's ability to be thermally processed without premature vulcanization or crosslinking. As the rubber begins to crosslink, it can no longer be extruded and/or formed into a useful article, and thus, long scorch times are desirable. Rubber compounds with longer scorch times can be processed at higher temperature and can be reworked more than rubber with shorter scorch times. Compounds with longer scorch times can significantly improve tire plant productivity.

U.S. Pat. No. 4,076,550, issued to Thurn et al., discloses silanes with the following structure, which yielded vulcanizates having acceptable physical properties and acceptable scorch behavior.

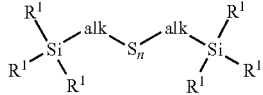

In this structure alk represents divalent hydrocarbons of 1 to 18 carbons, n is a number between 2 and 4, and R1 represents an alkoxy group. Some silane compounds may have the capability of reacting with silica, but may not necessarily be a good coupling agent unless some part of the molecule also reacts with the rubber to bind the silica to the rubber. What distinguishes Thurn's class of silane compounds as a coupling agent is that compounds in Thurn's group have the ability to react both with the silica (through the trialkoxysilane groups) and react with the rubber (through the Sn groups).

Thurn found that bis-(3-triethoxysilylpropyl)tetrasulfide (TESPT) was particularly useful as a coupling agent in dry blending silica and rubber. Thurn compared vulcanizates made with this class of compounds to vulcanizates made with γ-mercaptopropyl trimethyoxysilane (MPTMS), which is disclosed in Belgian Patent 760,099, and found that while both gave improved vulcanizates, the compound made with γ-mercaptopropyl trimethyoxysilane had a very low scorch time. This made processing the green rubber difficult, if not impossible, during downstream operations due to premature vulcanization.

Thurn's conclusion regarding the effect of silanes with terminal mercapto groups on scorch time was also verified by Poh and Ng, who found that silanes terminated with a mercapto group (specifically mercaptopropyl trimethyoxysilane) were more scorchy in natural rubber compounds than silanes such as bis-(3-triethoxysilylpropyl)-disulfide, which did not contain a terminal mercapto group. See Poh and Ng, "Effect of silane coupling agents on the Mooney scorch time of silica-filled natural rubber compound," European Rubber Journal, Volume 34, issue 7, July 1998 pp. 975-979. Thus, coupling agents based on a structure containing a terminal mercapto group would be expected to be scorchy if used as a hydrophobating agent in silica masterbatch.

Instead of mixing silica into rubber in the dry mixing process, silica can be incorporated into rubber in a concentrated amount to form a silica-filled rubber masterbatch, which can then be mixed with rubber to disperse the silica to a desired concentration in a final product. A silica-rubber masterbatch is a combination of filler and polymer and, optionally, other compounding ingredients such as process oil and other inert materials. There are a number of commercially available carbon black masterbatches available in polymer matrices, especially emulsion styrene-butadiene rubber (SBR). In spite of many efforts over the years, there is no corresponding commercial silica masterbatch. A number of problems have prevented the successful commercialization of silica-rubber masterbatch. Some of the problems with a silica masterbatch relate to the lack of interaction of silica with non-polar polymers such as SBR. To develop a successful silica masterbatch, two things are desired—1) treatment of the surface with an agent to make the silica more compatible with the rubber, which is the process of hydrophobating the silica, and 2) once attached to the silica, the agent should be capable of interacting with the cure system of the rubber to bond the rubber to the silica during cure.

Rubber can be made in an emulsion or wet process in water or in a solution process in an organic solvent. Silica is added to the process in which rubber is made to make a silica-rubber masterbatch. One problem in making a silica masterbatch is when untreated silica is added to an emulsion of SBR (the emulsion or wet process) or to a solution of SBR in an organic solvent (the solution process), the silica does not completely incorporate into the polymer and separates as fines when coagulated. These fines not only reduce the value of the masterbatch, but also cause a processing problem in that the fines have to be disposed of or recycled. There have been a number of efforts to improve the interaction of silica with non-polar polymers so that a silica masterbatch can be obtained. In the case of solution silica masterbatch, U.S. Pat. No. 7,307,121, issued to Zhang, teaches treating the silica in an organic solvent with a mercaptosilane and a silane coupling agent such as bis(triethoxysilylpropyl)disulfide (TESPT), which is typically used for silica tread compounds, then blending the treated silica into an organic solution of the SBR. This reduces the loss of silica on steam stripping the polymer cement. A wide variety of silanes can be used in this process, because the silica reacts directly with the silane to hydrophobate the silica. The silanes have a reactive portion that binds the silica to the rubber on vulcanization.

In the wet silica masterbatch process, U.S. Pat. Nos. 3,686, 219; 3,694,398; 3,689,451; 3,689,452; 3,700,690; 3,716,513 and 3,840,382, issued to Burke and incorporated by reference, teach how to use an aqueous dispersion of never-dried alkali silica pigment or a mixture of an aqueous dispersion of never-dried alkali silica pigment and carbon black to make a dispersion of these fillers in a matrix of rubbers at levels of less than 100 parts filler per hundred parts rubber (phr). To improve the interaction between polymer and filler, which is to hydrophobate the silica, Burke treated the silica with the salt of a carboxylic acid, amines or carboxylic acid derivatives of amines. This hydrophobation makes the polar surface of the silica non-polar and allows the hydrophobated silica to incorporate into the non-polar polymer. With the silica hydrophobated, Burke was able to prepare masterbatches where all of the silica was incorporated into the polymer and no silica remained in the serum after coagulation of the latex and the silica. These hydrophobating agents, however, did not effectively interact with the cure system to bind the silica to the rubber, and thus, relatively poor vulcanizate properties were obtained.

U.S. Pat. No. 5,763,388, issued to Lightsey et al., discloses a process for incorporating silica into a rubber latex in a wet (emulsion) process for making rubber. Lightsey treats the silica with an organo silicon compound coupling agent in aqueous suspension to form a compatibilized silica, which is added to a rubber latex that is coagulated, dried and recovered as a silica-impregnated rubber masterbatch. In Lightsey, a γ-mercaptopropyl trimethyoxysilane was dissolved in an acidic water/isopropanol solution. The solution was used to hydrophobate silica, which was then used to make the silica masterbatch. Although no compounding data was provided, based on Thurn's work, it would be expected that the masterbatch made using Lightsey's procedure would be scorchy since the hydrophobating agent that Lightsey used was the same that Thurn found to be scorchy. Another problem with the process described in the Lightsey '388 patent is that a substantial amount of alcohol was used to dissolve the silane compound, which requires a substantial cost to recover or dispose of the alcohol. In Lightsey's example 1, 55.1 g of the γ-mercaptopropyl trimethyoxysilane was dissolved in 27 g of isopropanol, 1.1 g of glacial acetic acid and 27 g of water, thus the solvent system consisted of 50% alcohol, which must be disposed of or recovered. Also in Lightsey's examples 2 and 4, the solvent system consisted of 50% alcohol. Thus, the silane compound that Lightsey discovered worked well to disperse silica in rubber required a great deal of alcohol, which requires a high cost to remove the alcohol from the latex serum for recycle or a high cost in wastewater treatment.

A silica-impregnated rubber having a good scorch safety can be made using silanes that are insoluble in water or insoluble in water/alcohol mixtures, but the prior art processes use one or more surfactants, which complicates the process. There are additional mass transfer steps during the hydrophobation process, specifically from the dispersion of the silane through the water onto the silica, which can cause a non-uniform hydrophobation. In addition, the surfactants may interact with the silica surface, which may have a detrimental effect on the final silica masterbatch properties. An example of such a process can be found in U.S. Pat. No. 6,713,534, issued to Goerl et al. Goerl used a common silane that is used in dry mixing silica, bis-(3-triethoxysilylpropyl) tetrasulfide, which as Thurn showed, provides adequate scorch safety. The problem with the Goerl process is that it is cumbersome and requires additional ingredients, which may adversely affect the overall performance of the product.

There remains a need for a wet (emulsion) silica masterbatch process in which the masterbatch can be economically manufactured, will effectively interact with a cure system to bind silica to rubber and produce a vulcanizate having acceptable properties.

SUMMARY OF THE INVENTION

This invention provides in one embodiment a process for the preparation of silica masterbatch using a wet process where the silica is fully hydrophobated and the resulting product has excellent scorch safety when cured into rubber compounds. Additionally, this invention provides a process for preparing silanes suitable for such a process. One aspect of the present invention is the use of specific methoxy silanes to hydrophobate the silica so that the hydrophobation provides a hydrophobated silica that can be essentially completely incorporated into the masterbatch with no loss of silica. Silane coupling agents, or their reaction products with water, according to the present invention are soluble in alcohol/water mixtures containing at least about 70% water. Silica masterbatch made according to this invention can be used in rubber compounding without scorch problems.

In one embodiment, a slurry of silica in water, or in a solution of water and an organic solvent containing about 70% water, is treated with a methoxy silane, or a mixture of methoxy silanes, to give a hydrophobated silica. The hydrophobated silica is combined with latex, and optionally with other compounding ingredients such as processing oils, prior to coagulation. The mixture can be coagulated using conventional coagulation agents to form a crumb rubber, and calcium chloride is a preferred coagulating agent. The crumb is preferably dewatered and preferably dried to form a silica masterbatch.

In another embodiment, the resulting silica masterbatch is mixed with other ingredients used in rubber compounding and vulcanized to give rubber articles, especially tires. The methoxy silane, or mixture of methoxy silanes, used in the silica masterbatch is chosen to provide good scorch safety when used with conventional cure systems in the final rubber article.

In one embodiment, this invention provides a water soluble or water/alcohol soluble silane or silane reaction product, where the water/alcohol mixture contains at least about 70% water, and where the soluble silane or silane reaction product is capable of hydrophobating silica and providing scorch safety. Methoxy substituted silanes with the structure shown below as Formula 1 have been found to successfully hydrophobate the silica in a wet process for silica masterbatch and provide excellent scorch safety:

                          $[(CH_3O)_3Si\text{-}(Alk)_m\text{-}(Ar)_p]_q[B]$        Formula 1 where
B is —SCN, R—C(═O)S, (if q=1) or $S_x$ (if q=2);
Alk is a straight chained or branched bivalent hydrocarbon radical;
R is an alkyl group containing 1 to 18 carbons;
m is 0 or 1; p is 0 or 1; m+p=1; q=1 or 2;
Ar is an arylene radical having from 6 to 12 carbon atoms; and
X is a number from 2 to 8; and where the silane or its reaction product with water is substantially soluble in alcohol/water mixtures containing at least about 70 wt % water.

In one embodiment, these methoxy silane coupling agents are mixed with methoxy silanes that are not reactive with rubber during vulcanization, and the mixed silane coupling agents are used to hydrophobate silica. The other methoxy silanes, which are not capable of interacting with the rubber, help to effectively hydrophobate the silica. These optional trimethoxysilanes used in the mixture are represented by $(CH3O)_3Si$-alkyl, where alkyl is a straight chained or branched hydrocarbon radical containing 1 to 6 carbons. By using a blend of the trimethoxy silane coupling agent and the optional trimethoxy silane, it is possible to control masterbatch properties such as scorch and Mooney viscosity.

In another aspect, the present invention provides a process for making a trimethoxy silane coupling agent, which includes the steps of adding methanol to a reactor; adding $Si(Hal)_3$-Alk-Hal or Si—$(OCH_3)_3$-Alk-Hal to the reactor, wherein Hal is fluorine, chlorine, bromine or iodine, and wherein Alk is a bivalent alkyl radical having 1 to 4 carbon atoms; adding sulfur and a hydrosulfide of the formula MeSH to the reactor, wherein Me is a metal selected from the group consisting of ammonium, an alkali metal atom, an equivalent of an alkaline earth metal, and zinc; ensuring the water content in the reactor is low; and forming a trimethoxy silane coupling agent having the structure $(CH3O)_3$—Si-Alk-$S_x$-Alk-Si—$(OCH3)_3$, where x is a number from 2 to 8, and where the trimethoxy silane coupling agent is soluble in a solution of water and alcohol that comprises at least about 70 percent water by weight. The methanol preferably meets the specification for U.S. Federal Grade AA. The water content of the methanol is preferably below about 500 ppm and is more preferably below about 250 ppm and is most preferably below about 100 ppm. The MeSH is preferably dried to 1% water or less.

Other embodiments and advantages of the present invention will become apparent to those skilled in the art upon a review of the following detailed description of exemplary embodiments of the invention.

DETAILED DESCRIPTION OF THE INVENTION

The present invention provides in one embodiment a process for making methoxy silanes that are useful for hydrophobating silica, in another embodiment a process for using the hydrophobated silica in an emulsion or wet process for making a silica-filled rubber masterbatch, and in another embodiment a process for using the silica masterbatch to make rubber products, particularly a process for making tires. The following disclosure will first consider silane compounds, particularly methods for making silane compounds that can be used to hydrophobate silica in such a way that ultimately a rubber product can be made advantageously. A process for making silica and for hydrophobating the silica will be disclosed. A process for making rubber and incorporating silica into the rubber to make a silica-filled rubber masterbatch will be disclosed, and a process for making rubber products using the silica-filled rubber masterbatch will be disclosed.

Silane Compounds

Examples of silane compounds useful in this invention include 3-octanoylthio-1-propyltrimethoxysilane, which can be prepared from the corresponding triethoxysilane that is commercially available from Momentive Performance Materials (187 Danbury Rd., Wilton Conn., 06897 USA); bis-(3-trimethoxysilylpropyl)-disulfide (TMSPD), which can be prepared using the procedure outlined in U.S. Pat. No. 5,440,064, issued to Agostini et al. and incorporated by reference, and bis-(3-trimethoxysilylpropyl)-tetrasulfide (TMSPT), which can be prepared using the procedure outlined in U.S. Pat. No. 4,072,701, issued to Pletka et al. and incorporated by reference. Preferred silane compounds for the present invention include, but are not limited to, bis-(3-trimethoxysilylpropyl)-disulfide (TMSPD) and bis-(3-trimethoxysilylpropyl)-tetrasulfide (TMSPT). One of the important features of these silane compounds for the present invention is that they, or their reaction product with water, are substantially soluble in alcohol/water mixtures containing at least about 70% water, preferably at least about 80% water, more preferably at least about 90% water and most preferably at least about 95% water by weight. We found that if the silane compounds are not soluble in as little as about 70 wt % water and no more than about 30 wt % alcohol, the silane compound will not effectively hydrophobate the silica. The consequence of not effectively hydrophobating the silica is that the silica is not fully incorporated into the silica-filled rubber masterbatch, resulting in a masterbatch composition that is incorrect and does not meet specifications; silica lost in the process, which increases raw material costs; and additional cost associated with disposing of the waste silica that was lost in the process.

While the Agostini '064 patent teaches a process for making TMSPD that is very effective in the laboratory, it is not commercially viable. The process produces a stoichiometric amount of manganese dioxide, which must be disposed of as a waste product. Thus, both from an economic and environmental standpoint, the process should not be used industrially. The '064 patent is also limited to TMSPD and cannot be used for TMSPT. The Pletka '701 patent can be used in theory to make either material.

In principle, there are three approaches to making TMSPD. In the approach used in the Pletka '701 patent, a chlorosilane is reacted with sulfur and a hydrosulfide in such a manner as to produce the TMSPD with an average sulfur chain length of two. A second approach would be to use any standard method for making a disulfide from 3-mercaptopropyl trimethoxy silane. A list of standard methods for making disulfides can be found in a treatise by S. Uemura in Comprehensive Organic Synthesis, Vol. 7; B. Trost and I. Fleming Eds; 1991, p 757 ff. The methods include oxidation with molecular oxygen, oxidation with various peroxides, oxidation with halogens and reaction with sulfoxides such as dimethylsulfoxide. All of these methods, however, could not be used with 3-mercaptopropyl trimethoxy silane, and those skilled in the art would have to choose a suitable method. Care must be taken to avoid any water in the synthesis as this would cause hydrolysis of the TMSPD and subsequent condensation. Also, if there is any minor amount of hydrolysis, basic conditions should be avoided as this will greatly increase the rate of condensation. Finally the third method for preparing TMSPD would be by transesterification of other silyl ethers, such as TESPD, with a suitable transesterification catalyst.

Silanes with sufficient purity to hydrophobate silica for use in silica masterbatch, which meet commercial needs, have not been found by these inventors in the prior art. Pletka teaches in U.S. Pat. No. 4,072,701 that sulfur containing organosilicon compounds of the formula Z-Alk-Sx-Alk-Z, where Z can be (among other groups) —Si(R$_2$)$_3$ where R$_2$ is an alkoxy of 1 to 8 carbon atoms can be prepared that are useful in this invention. This class of compound is made by reacting a compound with the formula Y-Alk-Hal, where Y can be —Si (Hal)$_3$ and where Hal is fluorine, chlorine, bromine or iodine, with at least one compound of the formula R$_3$OH, where R$_3$ is alkyl of 1 to 8 carbon atoms (among other groups), and with a hydrosulfide of the formula MeSH, where Me is a metal selected from the group comprising ammonium, an alkali metal atom or an equivalent of an alkaline earth metal, and with sulfur, preferably in the presence of at least one organic solvent. Although Pletka mentions that it is "advantageous to carry out the reaction while excluding air and/or water (moisture) to suppress the formation of byproducts" (column 2 line 27), the inventors discovered that sulfur containing organosilicon compounds made according to Pletka's process did not consistently yield an acceptable product. Part of the problem with Pletka's procedure may be the water in the raw materials. Typically the alcohol solvent will pick up moisture if handled in air, and even more serious is the natural state of sodium hydrosulfide, which may contain 30% water of hydration. Pletka does not mention any pretreatment of his reagents.

The present invention provides in one embodiment an improvement to the process taught in the Pletka '701 patent for making silane compounds such as bis-(3-trimethoxysilyl-propyl)-disulfide and bis-(3-trimethoxy-silylpropyl)-tetrasulfide. In the Pletka process, 3-chloropropyl trichlorosilane is reacted with a slight excess of an alcohol to form 3-chloropropyl trialkoxysilane and hydrogen chloride. The resulting trialkoxysilane is treated with a metal hydrosulfide and sulfur in an alcohol solvent to give bis-(3-trialkoxysilylpropyl)polysulfide and a metal chloride salt. Alternatively, one can start with the 3-chloropropyl trialkoxysilanes and react it with the metal hydrosulfide and sulfur in alcohol to give bis-(3-trialkoxysilylpropyl)polysulfide. The product is separated from the salt and would be expected to be suitable for use as a coupling agent for dry mixed silica compounds. The problem with this procedure for making silanes for silica masterbatch is that very small amounts of water in the alcohol solvent used for the reaction or entrained moisture in the sodium hydrosulfide may leads to enough condensation prior to isolating the product so that the product cannot be used to make silica masterbatch. We found that by using the Pletka procedure to make TMSPD and taking no additional precautions other than mentioned in the Pletka '701 patent, the resulting TMSPD silane could not be used to make silica masterbatch. Results of these tests are shown in a Comparative Example below.

This reaction was studied further, and the reaction was monitored using High Pressure Liquid Chromatography. An attempt to duplicate the Pletka procedure for TMSPD using reagents as received from the manufacturer showed that TMSPD was made in the synthesis, but was decomposed as the reaction proceeded. The water content of the following raw materials was measured using the Karl-Fisher method: 3-[(trimethoxysilyl)propyl]chloride was found to contain less than 10 ppm water; the sulfur contained about 1 wt % water; anhydrous methanol contained less than 10 ppm water, but the sodium hydrosulfide contained about 32 wt % water. Due to the amount of water in the raw materials, it is doubtful the Pletka procedure used with a trimethoxysilane starting material can be used for making high-purity methoxysilanes, unless steps are taken to remove most of the moisture from the raw materials. We discovered that if the Pletka procedure is modified such that the water level in the solvent and other raw materials is kept low so that there is little condensation, or if a chain-stopping agent is used, the amount of condensation will be limited after the remaining water has reacted, and a silane compound can be produced from which a silica masterbatch can be prepared successfully. Keeping the reagents dry prevents reaction with water and subsequent condensation, so any methods to ensure that the solvent is dry in the reactor and during reaction, and that the metal hydrosulfide is dry prior to the reaction, should be effective. If there is water present, a chain-stopping agent will react with the intermediate bifunctional hydroxysilanes, which are derived from the desired methoxy silane, and stop the condensation prior to reaching a stage where it is no longer soluble in an aqueous solvent system containing about 70% water, making the silane no longer suitable for silica masterbatch.

There are a number of acceptable methods for drying the reagents for this reaction, and some are listed in Purification of Laboratory Chemicals 3$^{rd}$ Ed. by D. Perrin and W. Armarego. Methanol, for example can be dried and purified by fractional distillation to a moisture level of 100 ppm. If further moisture reduction is desired, the methanol can be passed through a bed of 4 Angstrom molecular sieves. Sulfur can be heated to greater than 100° in an inert atmosphere to dry the material. Sodium hydrosulfide can be dried by passing a stream of dry inert gas over the wet material and carefully storing the dry product as to avoid moisture gain. 3-mercaptopropyl trimethoxy silane will typically be dry (less than 100 ppm water) and can usually be used as received.

Thus, the present invention further provides an improvement in the Pletka procedure comprising 1) drying the metal hydrosulfide MeSH to some extent, preferably to about 1% moisture and 2) treatment of the reaction mixture prior to or during addition of the trialkoxysilane starting materials with a chemical with a composition consisting of $$SiX_nR_{(4-n)}$$

where X is a reactive group such as fluorine, chlorine, bromine, iodine or CH$_3$—O, R is alkyl or aryl and n is an integer between 1 and 4. This material can be added to the reaction mixture prior to the addition of the starting materials such that the water level in the reaction mixture prior to addition of the starting trialkoxysilane is sufficiently low that the resulting sulfurated silane can successfully be used to prepare silica masterbatch. Alternatively, if the SiX$_n$R$_{(4-n)}$ is monofunctional, meaning limited to n=1, then this agent may be added with the other reactants when making the methoxy silane coupling agent. In this case any remaining water could either react with the SiX$_n$R$_{(4-n)}$ or more likely react with the hydroxysilane produced by the reaction of any water in the reactor with the desired methoxysilane. This would significantly limit the molecular weight of any coupling product and should improve the solubility of the resulting product in 70/30 water/alcohol over a reaction product which had no chain stopper. If the resulting methoxysilane is soluble in water/alcohol mixtures containing about 70% water by weight, then the reaction has been successful in preparing a silane which can be used to hydrophobate silica for use in a wet silica masterbatch process.

Examples of $SiX_nR_{(4-n)}$ include, but are not limited to, chlorotrimethylsilane, chlorotriethylsilane, chlorotripropylsilane, bromotrimethylsilane, bromo-triethylsilane, bromotripropylsilane, fluorotrimethylsilane, methoxy trimethylsilane, methoxytriethylsilane, methoxytripropylsilane chlorotrimethylsilane, dichlorodimethylsilane, trichloromethylsilane, tetrachlorosilane, bromotrimethylsilane, dibromodimethylsilane, tribromo-methylsilane, tetrabromosilane, methoxytrimethylsilane, dimethoxydimethylsilane, trimethoxymethylsilane and tetramethoxysilane. Mixtures of such compounds can be used as well. This improvement can be used in the preparation of such silanes where the starting material is Y-Alk-Hal, where Y is Si—$(OCH3)_3$. One should use dry enough reaction conditions and reagents to ensure that little or no condensation of the desired silane takes place due to undesired moisture or limit the amount of condensation taking place by choosing a monofunctional $SiX_nR_{(4-n)}$ that will limit the extent of condensation so that the resulting silane is soluble in water/alcohol mixtures containing about 70% water by weight. However, we found that a minor amount of water appears to be required to make a silane compound because we found that completely dry reactants did not produce the desired sulfurated silane.

We discovered that the silanes that Lightsey prefers in U.S. Pat. No. 5,763,388, such as bis-(3-triethoxysilylpropyl)-disulfide (TESPD), when employed using the procedure outlined in the '388 patent, do not produce a hydrophobated silica suitable for a silica masterbatch due to poor solubility in water. See Comparative Example 2 and Table 4 below. Lightsey claims a broad range of silanes, but generally, the silanes would be expected to have poor solubility in an alcohol/water mixture containing about 70% water. The Lightsey specification states "[r]epresentative of coupling agents imparting compatibilization to the natural and synthetic polymers are those from the groups consisting of trialkylsilanes, dialkylsilanes, trialkylalkoxysilanes, trialkylhalosilanes, dialkyalkoxysilanes, dialkyldialkoxysilanes, dialkylalkoxyhalosilanes, trialkylsilanols, alkyltrialkoxysilanes, alkyldialkoxysilanes, alkyldialkoxyhalosilanes, and monoalkylsilanes, wherein the alkyl group is a C1 to C18 linear, cyclic, or branched hydrocarbon or combinations thereof, and wherein for some particular embodiments one or two alkyl groups can be replaced with a phenyl or benzyl group or one to two alkyl groups can be replaced with a phenyl, benzyl, or alkoxy substituted alkyl group." Column 6, lines 8-22. However, the chemical literature clearly teaches that not all of these silanes would be expected to be soluble in water. For example, in "Silane Coupling Agents" by Edwin Plueddemann, at page 51, it is stated that "the limit of solubility of $RSi(OH)_3$ (the hydrolysis product of the silane) in water is a 6-carbon aliphatic group or a 7 carbon aromatic group. Other hydrophilic organofunctional groups increase the water solubility as expected."

The process of dissolving an alkoxysilane in water is complex. While not wishing to be bound by a theoretical explanation of the phenomena, the methoxy silanes are most likely hydrolyzed to the corresponding hydroxy silanes, which are much more water soluble than the starting material. The hydroxy silanes are known to condense with themselves to form long chain compounds, which are not as effective in hydrophobating the silica. Thus, for purposes of preparing a silica masterbatch using an aqueous process, the silane or its reaction product with water should be soluble in water or in a water/alcohol mixture containing about 70% water during the hydrophobation process and prior to the condensation process.

This invention provides a process to make these silanes, which are suitable for silica masterbatch, based on addition of compounds to either limit the extent of condensation by reacting with early condensation products or by ensuring that the solvent and reactants are dry prior to addition of the reactants used by Pletka in U.S. Pat. No. 4,072,701. Since the lower alcohol solvents used by Pletka can readily adsorb water prior to being used in the reaction and the metal hydrosulfides may contain as much as 35% moisture in its common state, the moisture may lead to condensation of the resultant alkoxysilane product, which may adversely affect its ability to hydrophobate silica. In fact, simply handling the lower alcohol solvents in moist air prior to the reaction may lead to absorption of enough water to cause the resulting silane to be unsuitable for silica masterbatch due to condensation reactions. This will be less of a problem with the trichlorosilane starting materials used in all of Pletka's examples, since the trichlorosilane would be expected to react with water, but this is a major problem when using a trimethoxysilane starting material, which Pletka also claims but did not use in his examples. A chlorosilane starting material will react with any water present in the raw materials to dry the reaction system. Although Pletka claims trialkoxysilanes as starting materials, he provided no examples for using trialkoxysilanes as starting materials. If there is water in a trimethoxy silane starting material, Pletka will get hydrolysis and condensation. If there is water in a triethoxy silane starting material, Pletka may be able to conduct the reaction and isolate the product before there is condensation, because the ethoxy silanes are hydrolyzed much more slowly than the methoxy silanes. Since the present invention requires methoxysilanes, the Pletka procedure as written is of no value unless relatively dry raw materials are used.

This invention is based in part on the surprising discovery that conventional ethoxy silanes typically used in the rubber industry for dry mixing silica into rubber cannot effectively be used to hydrophobate silica in a wet masterbatch process without costly additional ingredients. For example, a comparison of the water solubility of the mercaptopropyl trimethoxysilane (MPTMS) to the mercaptopropyltriethoxysilane (MPTES) shows the methoxysilane to be soluble while the ethoxysilane is insoluble. (See Table 4 below.) The methoxy silanes of this invention are efficacious to both effectively hydrophobate the silica and provide a masterbatch with good scorch safety. They are chosen to provide the water solubility necessary for hydrophobation and the advantage of scorch safety.

It should be noted that the methoxy silanes of this invention are not typically used in the rubber industry for dry mix silica because toxic methanol is released during the mixing process. In fact, the methoxysilanes suitable for the rubber industry are difficult to find commercially, probably because demand is low because toxic methanol vapor is released during Banbury mixing. The corresponding ethoxy silanes are used in dry mixing because the byproduct from the mixing process is harmless ethanol. In the hydrophobation step of the silica masterbatch process envisioned here, the methanol is released during treatment of the aqueous solution of the silane with the silica. It can thus be isolated by distillation or treated using conventional wastewater treatment processes. There should be no methanol released during the mixing of the silica masterbatch made with these silanes.

Another important feature of the silanes of this invention is that they provide superior scorch safety. The details of scorch protection of rubber compounds is more fully discussed by James Mark and Erman Burak, "Science and Technology of Rubber," 3rd ed., chapter 7. A quote from this reference, however, shows the significance of this invention. "The importance of scorch control cannot be overemphasized . . . " (p. 340).

A difference in the scorch behavior of silanes used in the present invention and silica masterbatch made with prior art procedures is illustrated in Tables 1 and 2 below. In Tables 1 and 2, a silica masterbatch (SMB) using mercaptopropyl trimethoxysilane (MPTMS) disclosed in U.S. Pat. No. 5,763,388, issued to Lightsey, was prepared and compared to a silica masterbatch of the present invention. The data show that masterbatch made using the Lightsey procedure is more scorchy (20.2 minutes vs 44.5 minutes for a five point rise in Mooney viscosity at 135 C) than masterbatch made according to the present invention. In a tire plant, this additional scorch time provides a significant advantage in that rubber with a longer scorch time can be processed at a higher temperature, thus improving productivity. Scrap from extrusion can be put back into rework material without the formation of cured lumps in the recycled material, thus reducing the amount of scrap rubber produced in the plant. The scrap rubber results from continued heat history on rubber compound which has been processed multiple times via rework. As the scorch time is reduced, less work can be put into the stock before entire batches of rubber are lost to cured lumps in tire tread extrudates.

Process for Making Silica and for Hydrophobating the Silica

Silica for the present invention can include pyrogenic and precipitated siliceous pigments, although precipitated silicas are preferred. The siliceous pigments preferably employed in this invention are precipitated silicas, such as those obtained by the acidification of a soluble silicate, e.g., sodium silicate. Such silicas might be characterized, for example, by having a BET surface area, as measured by nitrogen gas, in the range of about 40 to about 600 and preferably in the range of from about 50 to about 300 square meters per gram. The BET method for measuring surface area is described in the Journal of the American Chemical Society, volume 60, page 304 (1930). Also important is surface area characterized by CTAB, which more accurately reflects the surface area that a polymer in a compound experiences. Such silicas might have surface areas in the range of from about 40 to about 600 and are preferably in a range of from about 50 to about 300 meters per gram using this test. The CTAB test is described in ASTM D6845-02 (2008). Various commercially available silicas may be used in the practice of this invention. Example silicas include Hi-Sil 190 and 233 from PPG Industries (One PPG Place, Pittsburgh, Pa., 15272 USA); Z1165MP and Z165 GR from Rhodia (Coeur Defense Tour A-37 eme etage, 110 esplanade Charles de Gaulle, Courbevoje 92931, France); and Ultrasil 7000 from Evonik-Degussa (379 Interpace Parkway, Parsippany, N.J. 07054-0677 USA).

Precipitated silica is manufactured by treating sodium silicate with an acid such as sulfuric acid in a chemical reactor. The resulting crude silica is filtered and washed to remove the sodium sulfate byproduct, forming the wet-cake silica. Conventionally, the wet-cake silica was dried in a spray drier and in a mill polish drier, after which it was packaged and transported for use as a dry particulate matter. The processing of silica after the wet-cake is made is a significant cost factor in making conventional dry silica product. One aspect of the present invention is the use of the wet-cake silica directly, eliminating the expense of drying and packaging the silica. This silica can be isolated prior to drying and compaction and has the advantage of being easier to disperse in the rubber.

To hydrophobate the wet-cake silica before it is added to the rubber-making process, the silica is treated with a silane coupling agent, which is dissolved in an aqueous alcohol solution. In the first step of the process, a methoxy silane coupling agent is dissolved in approximately an equal volume of alcohol with a catalytic amount of acetic acid. Secondly, water is slowly added to the solution over a 15-60 minute period to provide a final alcohol/water ratio of no more than about 30% so as to minimize the need to recycle or dispose of the alcohol. Preferably at the end of the water addition, the alcohol content is less than 10% of the solvent system, and more preferably, the alcohol is less than 5% of the solvent system. During the addition the mixture may become cloudy, but this clears up as the hydrolysis proceeds. After the addition of water is complete, the solution is agitated for about 30 minutes to ensure complete hydrolysis. The amount of trimethoxy silane coupling agent made in the hydrolysis step is calculated so as to match the amount of silica being hydrophobated. The amount of coupling agent is usually indicated as a weight percent of silica used and will depend on the individual silane and silica surface area, but will be preferably from about 2% to about 10 wt %, and more preferably from about 4% to about 8 wt % of the silane compound relative to the silica. The silica to be hydrophobated will be in a slurry form with a suitable viscosity so that it can be agitated easily. Preferably, the silica concentration is between 1% and 25%, more preferably between 4% and 15% and most preferably between 6% and 10%. The silica slurry and solution of hydrolyzed coupling agent are mixed together and stirred for about 30 minutes. The pH of the mixture is then adjusted with sodium hydroxide to about 7.5. The mixture is heated at about 160° F. for about three hours to provide the hydrophobated silica in slurry form. The silica will typically be hydrophobated at the rubber plant. At the rubber plant, after the silica is hydrophobated, it is fed into a tank, mixed into a rubber latex solution for dispersion, and incorporated into the rubber during coagulation.

In the present invention, the wet-cake silica is preferred to make silica masterbatch, but since wet-cake silica is approximately 80% water, shipping the material is not generally economical. Thus, ideally the wet-cake silica should be used in silica masterbatch at or near the polymer plant site where the masterbatch is made. If transportation costs of the wet-cake silica can be overcome, there is significant economic advantage to using the silica masterbatch in rubber compounds instead of dry mixing the silica. Much of the cost of the silica used in the dry mix process is due to drying the silica in the silica plant. In the process for making silica masterbatch, the wet-cake silica is not dried; instead, both the silica and the crumb rubber are dried when the masterbatch is dried. Thus, placing the silica manufacturing site and silica masterbatch manufacturing site in close proximity is economically advantageous. With the present invention, the capital expense for the silica drying equipment, the maintenance expense associated with the drying equipment and the energy cost required to remove the water from the wet-cake silica are eliminated because the wet-cake silica is added directly into the rubber latex without further processing, and it is dried with the polymer. The silica plant is preferably located at or near the rubber plant to minimize the cost of transporting the wet-cake silica from the silica plant to the rubber plant. The wet-cake silica can be moved from the silica plant to the rubber plant by truck, railcar and/or by pipeline.

The present invention provides further value downstream from the rubber plant, where users of rubber can reduce operating costs. The customers for rubber from a rubber plant who incorporate silica into their rubber products have mixed dry silica into rubber, which is very expensive with respect to energy consumption, capital spent in mixing equipment and maintenance of the mixing equipment. Tire manufacturers are one of the largest consumers of rubber. Tire manufacturers have conventionally mixed dry silica and rubber using Intermesh mixers and/or Banbury mixers to make a reaction mix, which is remilled in a rubber mixer, all of which is very expensive and time-consuming to operate. Tire manufacturers and other makers of silica-filled rubber products will realize significant savings in operating cost from using a silica-filled rubber masterbatch according to the present invention, because the silica in the masterbatch can be more easily mixed with and dispersed within rubber than dry silica with a silane compound. In addition, by using the silica masterbatch of the present invention, the tire manufacturers and other makers of silica-filled rubber products will not have to recover and dispose of alcohol from the silane compound as is required in the dry-mixing process.

Process for Making Silica-Filled Rubber Masterbatch

Consider next the embodiment of the present invention in which a process is disclosed for incorporating silica into a polymer in latex form in a wet or emulsion process. U.S. Pat. No. 6,646,028, issued to Lopez-Serrano Ramos et al., describes a process for making rubber and incorporating carbon black to make a carbon black masterbatch and is incorporated by reference. In the process for making rubber, various monomers can be used. In one embodiment of the present invention, styrene and butadiene monomers are mixed together in water in a wet or emulsion process, and additives including a modifier, an emulsifier and an activator are added to the solution to form a feed stream. The feed stream is fed to a heat exchanger that removes heat from the feed stream. An initiator is added, and the feed stream with the initiator flows through a series of stirred reactors. Polymerization occurs as the material flows through the reactors and continues as long as styrene and butadiene monomer units are available in the solution. To stop the polymerization at a desired polymer chain length, a short-stopping agent, such as hydroquinone, is added. The reactor product stream flows into a blowdown tank, and steam is added to strip out styrene and butadiene monomer. Flash tanks and stripping columns can be used to further remove any residual monomer, forming a stripped, aqueous latex stream, which flows into latex storage tanks.

The silica and latex can be brought together in either a batch or continuous process. In the continuous process, streams of the latex and the hydrophobated silica are blended together in a pipe and the flow rates of the silica slurry and latex are controlled in such a manner that the desired ratio of silica to rubber is obtained in the final coagulated rubber. Conventional static mixers can be used in the pipe to achieve mixing. By the time the pipe empties into the coagulation vessel, the hydrophobated silica and latex have been fully mixed. In the batch process, a measured amount of latex of known rubber content is charged to an agitated vessel and the silica slurry is fed into the vessel and allowed to mix until the silica is adequately dispersed in the latex. In either process the rubber to silica ratio will be greater than 0.3/1.0 and will preferably be between 10/1 and 1/1 and more preferably between 4.0/1.0 and 1.25/1.0. A coagulation agent is added to coagulate the latex to form rubber crumb in an aqueous serum. Typically, the concentration of coagulant aid in the serum is less than about 200 or so parts per million (ppm). Typical coagulating agents include sulfuric and hydrochloric acid, sodium chloride and aluminum sulfate, depending on the rubber that is made.

Coagulation is an important aspect in the successful preparation of a silica-filled rubber masterbatch made according to the present invention. In coagulating an emulsion rubber, the coagulation system should effectively take all of the rubber out of the aqueous phase. In the case of a silica masterbatch, the coagulation system should also effectively take all of the rubber and silica out of the aqueous phase. If silica is left in the aqueous phase after coagulation, the resulting fines will interfere with the downstream processing of the rubber and may lead to economically unacceptable loss of material.

The present inventors have discovered that a particular coagulation agent can be used to successfully coagulate the latex in an emulsion SBR and incorporate silica into the latex. The prior art, where silanes are used to hydrophobate the silica for the preparation of a silica masterbatch based on a latex rubber, fails to appreciate the importance of the coagulation media for the processability of the final silica masterbatch. In fact, Lightsey states "[t]he coagulation of the latex is generally conventional and does not form any part of the present invention." U.S. Pat. No. 5,985,953 at column 9, line 13, and U.S. Pat. No. 5,763,388 at col. 7, line 66. Goerl states that Lewis acids are the preferred salts for coagulation. "Preferable salts include magnesium chloride, zinc sulfate, aluminum chloride, aluminum sulfate, iron chloride, iron sulfate, cobalt nitrate and nickel sulfate, preference being given to the aluminum salts." U.S. Pat. No. 6,720,369 at col. 4, line 23.

The present invention improves silica masterbatch by identifying calcium chloride as a coagulation media that better incorporates silica into the latex during the coagulation process. We discovered, unexpectedly, that using calcium chloride as a coagulation media for making a silica masterbatch, where the silica has been hydrophobated with a silane, significantly lowers the Mooney viscosity of the silica masterbatch as compared to using other conventional coagulation media. In addition, the calcium chloride coagulant improves the incorporation of the silica into the masterbatch as evidenced by the data in Table 3 below. The amount of calcium chloride coagulant added to the serum provides a concentration in the serum of less than about 5 wt %, preferably less than about 2.5 wt %, more preferably less than about 1.0 wt %, and most preferably between about 0.2 and about 0.8 wt %. We found that adding an amount of calcium chloride to yield a concentration of about 0.6 wt % calcium chloride in the serum works well to coagulate the rubber latex.

A rubber product is formed in the coagulation tank as the latex coagulates to form rubber and incorporates the silica in its matrix during rubber crumb formation. The product consists of a highly dispersed silica in a rubber matrix. The rubber product is dewatered, then dried in a dryer and conveyed with a conveyor to a baler. Bales of rubber, typically weighing about 80 lbs but of any desirable weight, are weighed, wrapped in a film and boxed or crated for shipment to a tire plant or other consumer of rubber. The rubber product made according to the present invention, which contains a thoroughly dispersed amount of silica, is referred to as silica masterbatch.

Any method that effectively dewaters the coagulated product can be used. In a laboratory, the crumb can be simply filtered and pressed dry. In a production operation, examples of suitable dewatering units include a French Oil Machine, a chamber filter press and an inverting filter centrifuge. The filter press and centrifuge are preferred. The latter two are described in U.S. Pat. No. 6,878,759 for use with silica masterbatch. Any known method for drying the dewatered masterbatch to a level of moisture below about 3% can be used. In the laboratory this can be accomplished with a forced air oven. In a production environment, a tunnel drier or fluid bed drier can be used.

Any rubber, elastomer or polymer that can be made into an aqueous dispersion can be used in this invention. It is also possible to use blends of rubbers in this invention. The polymer is preferably selected from the group consisting of styrene-butadiene rubber, natural rubber, acrylonitrile butadiene rubber, neoprene rubber, polybutadiene rubber, vinyl pyridine butadiene rubber and styrene butadiene termonomer rubber, where the termonomer is chosen from the group consisting of hydroxyalkyl acrylate, vinyl pyridine and acrylonitrile. The styrene butadiene termonomer rubbers are more fully described in a paper by Georges Thielen entitled "Chemically Modified Emulsion SBR's In Tire Treads," which was presented at the 172nd Technical Meeting of the Rubber Division of the American Chemical Society.

Optional ingredients that can be included with the silica and latex include such materials as processing oils, other fillers such as carbon black, talc or clay, stabilizers such as 6-PPD or other antidegradants, zinc salts, waxes, resins, or crosslinking chemicals. Any material necessary for further compounding, which does not interfere with the coagulation and other downstream processes, can be included.

The amount of silica in the final compound where the masterbatch is used can vary widely. For tire compounds, this may vary between 10 parts per hundred rubber and 90 parts per hundred rubber. To maximize flexibility in compounding with the silica masterbatch, the level of contained silica in the silica masterbatch should be as high as the process equipment in both the polymer plant and tire plant can handle. In the polymer plant, the masterbatch should produce few fines in the coagulation and be processable throughout the rest of the process. In the tire plant, the silica masterbatch must be readily dispersable with any other rubber or compounding ingredient used to make the final compound.

In simpler terms and summarizing, the present invention provides a process for making a silica-loaded-rubber masterbatch, which includes the steps of:

(a) treating a silica with a trimethoxy silane coupling agent in aqueous solution to form a compatibilized silica slurry, the coupling agent having the capability of chemically reacting with the surface of the silica to bond the coupling agent thereto, wherein the trimethoxy silane is represented by the formula:

$$[(CH_3O)_3Si\text{-}(Alk)_m\text{-}(Ar)_p]_q[B],$$

where
B is —SCN, R—C(=O)S, (if q=1) or $S_x$ (if q=2);
Alk is a straight chained or branched bivalent hydrocarbon radical;
R is an alkyl group containing 1 to 18 carbons;
m is 0 or 1;
p is 0 or 1,
m+p=1;
q is 1 or 2;
Ar is an arylene radical having from 6 to 12 carbon atoms;
x is a number from 2 to 8;

(b) contacting the polymer latex with the compatibilized silica slurry and optionally any other compatible compounding ingredient whereby the silica and all optionally included ingredients are substantially uniformly distributed throughout the latex;

(c) coagulating the latex from (b) into a crumb;
(d) dewatering the coagulated crumb; and
(e) drying the dewatered crumb, wherein the silane (or its reaction product with water) is substantially soluble in alcohol/water mixtures containing about 70% water. Preferably, x is a number from 2 to 4, q is 2, m=1 and B is $S_x$. More preferably, the silane coupling agent is bis-(3-trimethoxysilylpropyl)-disulfide (TMSPD).

In another embodiment, the present invention provides a process for the preparation of silica masterbatch, comprising the steps of:

(a) treating a silica with a mixture of trimethoxy silanes to form a compatibilized silica slurry, wherein the trimethoxy silanes bond to the silica, wherein a first portion of the mixture of trimethoxy silanes is a coupling agent represented by the formula:

$$[(CH_3O)_3Si\text{-}(Alk)_m\text{-}(Ar)_p]_q[B],$$

wherein
B is —SCN, R—C(=O)S, (if q=1) or $S_x$ (if q=2);
Alk—straight chained or branched bivalent hydrocarbon radical;
R is an alkyl group containing 1 to 18 carbons;
m is 0 or 1;
p is 0 or 1;
m+p=1;
q is 1 or 2;
Ar is an arylene radical having from 6 to 12 carbon atoms; and
x is a number from 2 to 8, wherein
a second portion of the mixture of trimethoxy silanes is represented by the formula $(CH_3O)_3Si$-alkyl, wherein alkyl is a straight chained or branched hydrocarbon radical containing 1 to 6 carbons, and wherein
the mixture of trimethoxy silanes (and/or their reaction products with water) is substantially soluble in alcohol/water mixtures containing about 70% water by weight;

(b) making a polymer latex and mixing the compatibilized silica slurry into the polymer latex;
(c) coagulating the polymer latex to form a crumb rubber;
(d) dewatering the crumb rubber; and
(e) drying the dewatered crumb rubber.

Preferably, the mixture of trimethoxy silanes is substantially soluble in alcohol/water mixtures containing about 70% water. Preferably, x is a number from 2 to 4, q is 2, m=1 and B is $S_x$. Preferably, the mixture of trimethoxy silanes includes bis-(3-trimethoxysilylpropyl)-disulfide (TMSPD). In this embodiment, the first portion of the mixture of trimethoxy silanes contains a functional group, such as a polysulfide, that reacts with rubber for coupling the silica to the rubber. The second portion of the mixture of trimethoxy silanes does not contain such a functional group and does not react with or bond to rubber. However, the second portion of the mixture of trimethoxy silanes more fully hydrophobates the silica, which is believed to aid in compatibilizing the silica with the hydrocarbon phase of the polymer latex so that the silica is more likely to be incorporated into the crumb rubber.

In another embodiment, the present invention provides a process for the preparation of silica masterbatch that includes:

(a) obtaining a trimethoxy silane coupling agent, wherein the trimethoxy silane coupling agent is made by a process comprising the steps of:
reacting methanol with $Si(Hal)_3$-Alk-Hal or with Si—$(OCH_3)_3$-Alk-Hal to form an intermediate product, wherein Hal is fluorine, chlorine, bromine or iodine, wherein Alk is a bivalent alkyl radical having 1 to 4 carbon atoms, and wherein water in the reaction mixture is maintained below about 1,000 ppm;

reacting the intermediate product with sulfur and with a hydrosulfide of the formula MeSH, wherein Me is a metal selected from the group consisting of ammonium, an alkali metal atom, an equivalent of an alkaline earth metal, and zinc; and forming the trimethoxy silane coupling agent, which has the structure $(CH_3O)_3$—Si-Alk-$S_x$-Alk-Si—$(OCH_3)_3$, wherein x is a number from 2 to 8, and wherein the trimethoxy silane coupling agent is soluble in a solution of water and alcohol that comprises at least about 70 percent water by weight;

(b) treating a silica with the trimethoxy silane coupling agent in aqueous solution to form a compatibilized silica slurry, the coupling agent having the capability of chemically reacting with the surface of the silica to bond the coupling agent thereto;

(c) making a polymer latex and mixing the compatibilized silica slurry into the polymer latex;

(d) coagulating the polymer latex to form a crumb;

(e) dewatering the coagulated crumb; and (f) drying the dewatered crumb.

The hydrosulfide is preferably dried to less than about 5 wt % water.

In another aspect of the present invention, the silica is prepared at the same rubber plant site as the silica masterbatch or transported to the rubber plant site by pipeline or located close enough to the rubber plant site for economical transportation by truck and/or rail car. If the silica source is located at the rubber plant, or if a silica slurry can be pumped through a pipeline to the rubber plant, the cost of transporting the large amounts of water associated with silica wet cake can be eliminated. The silane coupling agents can also be made at or near the silica masterbatch plant site. A tire plant or other plant for making rubber products using the silica masterbatch can also be located at or near the silica masterbatch plant site. Preferably, the processes for making the methoxy silanes, silica, hydrophobating the silica, making the silica-filled rubber masterbatch, and making rubber products, particularly tires, are located in a single industrial complex.

Process for Making Rubber Products

The silica masterbatch produced at the rubber plant according to the present invention can be used to make a variety of rubber products, such as hoses, tubing, gaskets, automobile parts and cable sheaths, but it is anticipated that the greatest use of the silica masterbatch will be in the tire manufacturing industry. The silica masterbatch will significantly improve the tire manufacturing process.

The tire manufacturing process can be divided into five general areas, as outlined by James Mark and Burak Erman, Science and Technology of Rubber, $3^{rd}$ ed., pp 655-661. These areas are 1) rubber mixing, 2) calendaring, 3) extrusion, 4) tire building and 5) curing. The mixing area is generally described in U.S. Pat. No. 5,711,904, which is incorporated by reference. Here polymers, fillers, oils and waxes are blended in a mixer to provide a "non-productive" mix which is then blended with curatives and mixed at a lower temperature to provide a "productive" mix, which is used in downstream processes. The second unit of the tire plant is the calendaring area and is generally described in U.S. Pat. No. 4,126,720, which is incorporated by reference. The productive-mix rubber is deposited on either fabric or steel cord in such a manner that all of the fabric or cord is coated with rubber. Rubber is placed on the calendar rolls in such a manner so that it is sheeted, and the fiber or wire is embedded into the sheet. Material coming off the calendar is cut to length and width for the tire building machine. The third area of the tire plant is extrusion, where components such as tread, apex and sidewall are processed. As with the mixing area, the extrusion process is described in U.S. Pat. No. 5,711,904. Rubber from the mixing area is put through either a "cold feed" or "hot feed" extruder with a die on the end. The rubber is pushed through the die which is cut such that the rubber being extruded has the necessary dimensions to be put on the tire building machine. The fourth area of the tire plant is the tire building area, where all of the components from previous operations, including the extruded parts, calendared plies, belts and beads, are assembled on building machines to provide a "green tire." This process is outlined in more detail in U.S. Pat. No. 4,402,782, which is incorporated by reference. The fifth area of the tire manufacturing process is the vulcanization of the green tire to provide the final product. The vulcanization process is outlined in U.S. Pat. No. 5,240,669, which is incorporated by reference. The green tire is placed into a mold, and is pressed into the shape of the mold with a heated rubber bladder which is pressurized with steam or hot water. The bladder keeps the green tire at elevated temperature for sufficient time to ensure complete curing of the tire, after which the tire is released to quality control.

There is significant value in using silica masterbatch to make tire tread instead of the conventional dry mixing process for adding silica to rubber. In a silica masterbatch process, silica is reacted with silane prior to mixing with the rubber to provide a hydrophobated silica, thus eliminating the need to recover or eliminate the alcohol from the silane in the rubber-mixing facility. The hydrophobated silica is blended with latex, and the mixture is coagulated. The coagulated silica/rubber mixture is dried at the polymer plant, and both the silica and polymer are dried in this step. This eliminates the cost associated with drying the silica wet cake to make the dry silica used in the conventional dry mixing process for making tire tread rubber impregnated with silica. With a silica masterbatch, the silica is already well dispersed throughout the rubber, so less mixing is required in the rubber-mixing plant to achieve the filler dispersion necessary for adequate reinforcement and wear resistance. Thus, the number of mix cycles can be reduced in the rubber-mixing facility with a silica masterbatch, and the productivity and profitability of a tire plant can be improved by using a silica masterbatch rather than a conventional, dry-mixing process for adding silica to rubber. Less time and energy is required to mix the silica-filled rubber masterbatch into the rubber at the tire plant than is required to mix dry silica directly into the rubber in a conventional dry-mixing process for achieving the same level of dispersion of silica in the tire products. In addition, by using the silica masterbatch of the present invention, the tire manufacturers and other makers of silica-filled rubber products will not have to recover and dispose of alcohol from the silane compound as is required in the dry-mixing process.

EXAMPLES

Comparative Example 1

Preparing a Silica Masterbatch (SMB) Using Mercaptopropyl Trimethoxysilane (MPTMS) Using a Modification of the Procedure Described in U.S. Pat. No. 5,763,388

A. Preparation of the Compatibilized Silica Slurry

An aqueous solution of silane was prepared by charging to a vessel 4 grams of isopropanol, 0.7 grams of acetic acid and then 1.57 grams (4% by wt silica) of mercapto Propyl trimethoxysilane (Silquest A189). The mixture was then stirred vigorously at room temperature while 96 grams of water was slowly added. The mixture was then stirred for a further 15 minutes until the solution cleared.

In a separate vessel equipped with a stirrer 196 grams of silica cake (20% solids) and 331 grams of water were charged. The mixture was then stirred for 15 minutes to ensure the cake was completely dispersed. Then the aqueous silane solution was added and stirred for a further 30 minutes. Using a 25% NaOH solution, the pH of the mixture was increased to 7.5. The mixture was then heated to approximately 70° C. for 4 hours while continuously mixing.

B. Preparation of Silica Masterbatch

In a vessel equipped with a stirrer, 320 grams of emulsion SBR latex containing 24.5 wt % 1502 SBR was charged, along with 25.48 grams of aromatic oil and 0.31 grams of antioxidant. The mixture was then heated to 50° C. while stirring. The compatibilized silica slurry from (A) was then added to the hot latex mixture. The latex/silica slurry mixture was then maintained at 50° C. for a further 30 minutes while being stirred. A 0.6% solution of calcium chloride was then added to the mixture to coagulate the latex. The crumb was then dewatered using a cheese cloth strainer. The dewatered product was then dried for 4 hours at 50° C.

Comparative Example 2

Attempt to Prepare Compatibilized Silica Slurry Using bis-(3-triethoxysilylpropyl)-disulfide (TESPD) Using a Modification of the Procedure Described in U.S. Pat. No. 5,763,388

Following the procedure in comparative example 1A, high purity TESPD with low levels of condensation products was used as the silane, but the silane was not soluble in the water-alcohol mixture so the procedure was unsuccessful. Attempts to use the insoluble silane led to gross amounts of free silica in the coagulated masterbatch.

Comparative Example 3

Attempt to Prepare Silica Masterbatch with TMSPD Made Using the Pletka Process in U.S. Pat. No. 4,072,701

TMSPD was prepared using the Pletka process with no unusual precautions taken to purify the methanol used in the process. The TMSPD was insoluble in a 70/30 water/isopropanol mixture so the hydrophobation procedure was unsuccessful. Attempts to use the insoluble silane to hydrophobate the silica led to gross amounts of free silica in the coagulated masterbatch.

Example 1

Preparation of SMB with bis-(3-trimethoxysilylpropyl)disulfide (TMSPD)

A. Preparation of Compatibilized Silica Slurry

An aqueous solution of silane was prepared by charging to a vessel 4 grams of isopropanol, 2.36 grams of TMSPD, which was prepared using the procedure of U.S. Pat. No. 5,440,064 and which contains essentially no condensation products (6.0% by weight of the silica to be charged later), and 0.7 grams of acetic acid. The mixture was then stirred vigorously at room temperature while 96 grams of water was slowly added. The mixture was then stirred for a further 15 minutes until the solution cleared.

In a separate vessel equipped with a stirrer, 196 grams of silica cake (20% solids with the remainder being water) and 331 grams of water were charged. The mixture was then stirred for 15 minutes to ensure the cake was completely dispersed. Then the aqueous silane solution was added and stirred for a further 30 minutes. Using a 25% NaOH solution, the pH of the mixture was increased to 7.5. The mixture was then heated to approximately 70° C. for 4 hours while continuously mixing.

B. Preparation of Silica Masterbatch

In a vessel equipped with a stirrer, 320 grams of latex containing 24.5 wt % 1502 SBR was charged, along with 25.48 grams of aromatic oil and 0.31 grams of antioxidant. The mixture was then heated to 50° C. while stirring. The compatibilized silica slurry was then added to the hot latex mixture. The latex/silica slurry mixture was then maintained at 50° C. for a further 30 minutes while being stirred. A 0.6% solution of calcium chloride was then added to the mixture to coagulate the latex. The crumb was then dewatered using a cheese cloth strainer. The dewatered product was then dried for 4 hours at 50° C.

C. Compounding with Masterbatch Made from TMSPD and Mercaptopropyl Trimethoxysilane.

120 grams of silica masterbatch was mixed on a two-roll mill made by Kobelco Stewart Bolling, Inc., which was set at an initial temperature of 140 F with a nip set to approximately 2 mm to form a rolling bank. The composition of the silica masterbatch is given in the first part of Table 1. The amount of silica used is shown on a dry weight basis. In the second part of the table, the amount of curatives used for the indicated amount of silica masterbatch is listed. The curatives were added and the resulting compound was rolled into a cylinder on the mill. The cylinder was turned 90° and fed back through the mill nip. The cylinder was put through the mill 10 times to complete the mixing. This procedure provides a standard method to mix silica masterbatch with curatives to evaluate scorch behavior and to determine physical properties in the resulting cured stocks.

TABLE 1

Recipe for compounding with masterbatch made from TMSPD and mercaptopropyl trimethoxysilane (MPTMS-A189).*

| Material in raw SMB | TMSPD | A189 MPTMS |
|---|---|---|
| SBR 1502 | 100.00 | 100.00 |
| Silica (dry wt) | 50.00 | 50.00 |
| TMSPD Silane | 3.00 | 0.00 |
| A-189 Silane | 0.00 | 2.00 |
| Aromatic Oil | 32.50 | 32.50 |
| 6-PPD | 0.40 | 0.40 |
| Total | 185.90 | 184.90 |
| Silica Master Batch | 185.90 | 184.90 |
| ZnO | 3.00 | 3.00 |
| St Acid | 2.00 | 2.00 |
| CBS | 1.70 | 1.70 |
| Sulfur | 2.00 | 2.00 |
| Total | 194.60 | 193.60 |

*All quantities are in grams

TABLE 2

Compounding results from SMB made with mercaptopropyl-trimethoxysilane (MPTMS-A189) and bis-(3-trimethoxysilylpropyl) disulfide (TMSPD) treated silica.

| | Tensile | | | | Scorch @ 135° C. | | MDR @ 171° C. | |
|---|---|---|---|---|---|---|---|---|
| Cmpnd | Tensile (psi) | M100 (psi) | M300 (psi) | Elong. (%) | $T_S5$ (min) | $T_S10$ (min) | T60 | T90 |
| TMSPD SMB | 2451 | 211 | 601 | 707 | 44.5 | 46.6 | 4.91/ 13.57 | 7.19/ 17.74 |
| A189 SMB | 2352 | 219 | 697 | 648 | 20.2 | 21.9 | 2.11/ 10.28 | 3.81/ 14.11 |

Tensile was measured using a procedure set forth in ASTM D412, and Mooney scorch time was measured using ASTM D1646 part C with a test temperature of 135° C. ASTM D2084 outlines the protocol for testing the cure rate and scorch properties of rubbers. As the data in Table 2 suggests, there is no significant difference between the tensile, modulus and elongation between the TMSPD and A189 silica masterbatch runs. The Mooney scorch time for the TMSPD masterbatch is approximately twice that of the A189 masterbatch, which is a highly significant difference that indicates the TMSPD silica masterbatch can be processed at a higher temperature in a tire plant, thus improving productivity and producing less scrap on rework.

For a rubber composition made according to the recipe in Table 1 and using a silica-filled rubber masterbatch made according to the present invention, the $T_s5$ scorch at 135° C. of the rubber composition is generally greater than about 25 min., preferably greater than about 30 min., more preferably greater than about 35 min. and most preferably greater than about 40 min. The experimental data in Table 2 shows the $T_s5$ scorch at 135° C. of the rubber composition is about 45 min. For an article made with a silica-filled rubber as a significant component, where the silica-filled rubber is made from a silica masterbatch made according to the present invention, the silica-filled rubber is likely to have a $T_s5$ scorch at 135° C. of greater than about 35 minutes.

D. Preparation of Silica Masterbatch Using Various Coagulation Systems.

In a vessel equipped with a mechanical stirrer, 400 grams of e-SBR latex containing 21.0 wt. % 1502 SBR was charged, along with 33.6 grams of aromatic oil and 0.34 grams of antioxidant. The mixture was heated to 50° C., then 364 grams of compatibilized silica slurry was added to the hot latex mixture. The latex/silica slurry mixture was then maintained at 50° C. for a further 30 minutes while being stirred.

With reference to Table 3 below, for sample SMB039, a 0.6% solution of calcium chloride was added to the latex mixture to coagulate the latex. For sample SMB040, a 0.3% solution of aluminum sulphate was added to the mixture to coagulate the latex. For sample SMB041, a 6% solution of NaCl in 0.1 N sulfuric acid solution was added to the mixture to coagulate the latex.

Each respective sample was dewatered with a cheese cloth strainer. The dewatered product was dried for 4 hours at 50° C. The serum from each respective coagulation was captured in a glass sedimentation vessel. The amount of unincorporated silica was isolated by decanting the serum following a 16 hour sedimentation. The silica was removed and then dried at 70° C. and the weight of the total dry silica residue measured. Results from this experiment are found in Table 3.

TABLE 3

Mooney viscosity and residual silica using various coagulation systems.

| Sample | Coagulant | Mooney (ML-4) | Free Silica in Serum |
|---|---|---|---|
| SMB039 | $CaCl_2$ | 58 | 0.5 gm |
| SMB040 | $Al_2(SO_4)_3$ | 68 | 1.0 gm |
| SMB041 | Salt-Acid | 80 | 5.0 gm |

The data in Table 3 demonstrates the unexpected benefits of coagulating silica masterbatch with calcium chloride. The calcium chloride provides a masterbatch with a lower Mooney viscosity, which makes it easier to process the masterbatch in a tire plant, and calcium chloride coagulant also reduces the amount of free silica that otherwise would have to be recycled or discarded as waste.

Example 2

Solubility of Silane Compounds

Silane coupling agents that are not sufficiently soluble in water do not effectively hydrophobate silica, in which case a great deal of silica is not incorporated into the masterbatch. If there is insufficient solubility, the composition of the silica-loaded rubber masterbatch does not meet tire manufacturing requirements, and silica is lost in the process, which increases raw material and waste disposal costs for the rubber plant. The following experiments were conducted to examine the solubility of various silane coupling agents.

TABLE 4

Solubility of Silanes in water-isopropanol mixtures.

| Silane | pH | % Water (wt.) | Soluble? |
|---|---|---|---|
| TESPD | 3.8 | 22.2 | Yes |
| TESPD | 3.5 | 27.8 | No |
| TMSPD (Present invention) | 4.1 | 96.0 | Yes |
| MPTMS (A189) | 3.5-4.0 | 63.2 | Yes |
| MPTMS (A189) | 3.5-4.0 | 96.0 | Yes |
| MPTES (ethyl version of A189) | 3.5-4.0 | 63.2 | No |

MPTMS—Mercaptopropyl trimethoxysilane
MPTES—Mercaptopropyltriethoxysilane

The data in Table 4 illustrate the solubility differences between methoxy and ethoxy silanes in alcohol/water solutions. Although the TESPD (ethoxy)silane is soluble in a solution that is 22.2% water, when the water concentration is raised to 27.8%, it becomes insoluble. In contrast, the TMSPD (methoxy)silane of the present invention is soluble in a solution that is 96% water. A similar effect is seen with the mercaptopropyl trialkoxysilanes. The MPTMS (methoxy)silane is soluble in a solution that is 96% water, while the MPTES (ethoxy)silane is insoluble in a solution that is only 63% water. Thus, it is not commercially practical to prepare silica slurry with the ethoxy based silanes such as bis-(3-triethoxysilylpropyl)disulfide because the large amount of alcohol necessary to solubilize the material will lead to either substantial costs for alcohol recovery or substantial costs for wastewater treatment to remove the alcohol. The fact that the triethoxysilanes are insoluble in water/alcohol solutions that are greater than 70% water could also indicate that the hydrolysis is not complete, and subsequent ability to hydrophobate the silica is decreased. The silane coupling agents of the present invention are soluble in water/alcohol solutions that are about 70% water. The process of this invention using silanes like MPTMS in alcohol solutions with as little as 4% alcohol is far superior to processes of prior art using other silanes. Thus, whereas silica masterbatch made with bis-(3-triethoxysilylpropyl)disulfide would be difficult to make because of its low water solubility, and masterbatch made with MPTMS would have a poor scorch time, use of the methoxysilanes of this invention, such as TMSPD, lead to a lower cost process and produce a material with superior scorch properties.

Significant efforts to hydrolyze TESPD have been put forth by the present inventors, because this would be the most economic route to the reaction product of TMSPD with water. All efforts to completely hydrolyze the TESPD have failed. These include conducting the reaction in both polar aprotic and protic solvents such as DMSO, formic acid, acetic acid and isopropyl alcohol. A number of different acids have been tried including formic, acetic and phosphoric. The effect of temperature was also investigated, with some runs being conducted at room temperature and others at 45° C. In no case could a soluble solution of the product be formed prior to condensation and chunks of polymer precipitating from the reaction mixture.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A process for the preparation of silica masterbatch, comprising the steps of:
   (a) hydrophobating silica by:
      (i) dissolving a trimethoxy silane coupling agent in a mixture of alcohol, acid and water to provide a trimethoxy silane coupling agent solution, wherein the amount of alcohol and water is at least 70% water by weight, and
      (ii) mixing the trimethoxy silane coupling agent solution with silica and adding a base to increase the pH to form a compatibilized silica slurry;
   (b) making a polymer latex and mixing the compatibilized silica slurry with the polymer latex;
   (c) coagulating the polymer latex from step (b) with a calcium salt to form a crumb, wherein carbon black is an optional ingredient but is not required for coagulating the polymer latex;
   (d) dewatering the coagulated crumb; and
   (e) drying the dewatered crumb.

2. A process for making silica masterbatch, comprising the steps of:
   (a) hydrophobating silica by:
      (i) dissolving a trimethoxy silane coupling agent in a mixture comprising alcohol and water to provide a trimethoxy silane coupling agent solution, wherein the amount of alcohol and water is at least 70% water by weight, wherein the trimethoxy silane coupling agent solution is acidic and has a pH of no less than about 3.5, and
      (ii) mixing the trimethoxy silane coupling agent solution with silica and adding a base to increase the pH to form a compatibilized silica slurry;
   (b) making a polymer latex and mixing the compatibilized silica slurry with the polymer latex;
   (c) coagulating the polymer latex from step (b) with a calcium salt to form a crumb;
   (d) dewatering the coagulated crumb; and
   (e) drying the dewatered crumb.

3. The process of claim 2, wherein the trimethoxy silane coupling agent is selected from the group consisting of mercaptopropyl-trimethoxysilane, bis-(3-trimethoxysilylpropyl)-disulfide and bis-(3-trimethoxysilylpropyl)-tetrasulfide, and wherein the calcium salt is calcium chloride.

4. A process for making a tire, comprising the steps of:
   receiving silica masterbatch, wherein the silica masterbatch is made according to the process of claim 1;
   making a nonproductive compound, wherein the silica masterbatch is used in making the nonproductive compound, and wherein additional rubber may or may not be used in making the nonproductive compound;
   mixing curatives with the nonproductive compound to make a final compound;
   making tire components, wherein the tire components comprise tread and sidewall, and wherein the final compound is processed to form at least one of the tire components;
   assembling the tire components into a green tire; and
   vulcanizing the green tire to make a finished tire.

5. The process of claim 4, wherein the silica masterbatch does not contain carbon black.

6. The process of claim 4, wherein calcium chloride is the calcium salt used in the process for making the silica masterbatch.

7. A process for making a rubber product, comprising the steps of:
   receiving silica masterbatch, wherein the silica masterbatch is made according to a process comprising the steps of:
      (a) hydrophobating silica using a procedure comprising:
         (i) dissolving a trimethoxy silane coupling agent in a mixture of alcohol, acid and water for promoting hydrolysis of the trimethoxy silane coupling agent for preparing the trimethoxy silane coupling agent for a condensation reaction, wherein the amount of alcohol and water is at least 70% water by weight, thereby forming a hydrolyzed trimethoxy silane coupling agent solution; and
         (ii) mixing the hydrolyzed trimethoxy silane coupling agent solution with silica, wherein a base is added to increase the pH for promoting the condensation reaction for bonding the trimethoxy silane coupling agent to the silica to form the hydrophobated silica;
      (b) making a polymer latex;
      (c) mixing the hydrophobated silica with the polymer latex; and
      (d) coagulating the mixture of polymer latex and hydrophobated silica with calcium chloride;
   making a nonproductive compound, wherein the silica masterbatch is used in making the nonproductive compound, and wherein additional rubber may or may not be used in making the nonproductive compound;
   mixing curatives with the nonproductive compound to make a final compound;
   making a rubber item comprising the final compound; and
   vulcanizing the rubber item.

8. The process of claim 7, wherein the rubber product is a: tire, tire tread, tire sidewall, tire apex, hose, belt, tread, tube, sheet, gasket, vehicle part or a cable sheath.

9. The process of claim 7, wherein the trimethoxy silane coupling agent is mercaptopropyl-trimethoxysilane, bis-(3-trimethoxysilylpropyl)-disulfide and/or bis-(3-trimethoxysilylpropyl)-tetrasulfide.

10. The process of claim 9, wherein the acid is acetic acid.

11. The process of claim 9, wherein the pH of the mixture of alcohol, acid and water into which the trimethoxy silane coupling agent is dissolved is no less than about 3.5.

12. The process of claim 9, wherein the base is added to increase the pH to about 7.5.

13. The process of claim 9, wherein the acid is acetic acid, and wherein the pH of the mixture of alcohol, acid and water into which the trimethoxy silane coupling agent is dissolved is between about 3.5 and about 4.1.

14. The process of claim 13, wherein the base is added to increase the pH to about 7.5.

15. The process of claim 9, wherein carbon black is not used in the process for making silica masterbatch.

16. The process of claim 9, wherein the pH of the mixture of alcohol, acid and water into which the trimethoxy silane coupling agent is dissolved is no less than about 3.5, and wherein carbon black is not used in the process for making silica masterbatch.

17. The process of claim 16, wherein the acid is acetic acid, and wherein the base is added to increase the pH to about 7.5.

18. The process of claim 1, wherein the pH of the mixture of alcohol, acid and water into which the trimethoxy silane coupling agent is dissolved is no less than about 3.5, and wherein the calcium salt is calcium chloride.

19. The process of claim 2, wherein the calcium salt is calcium chloride, and wherein the process does not include adding carbon black.

* * * * *